United States Patent Office 3,544,630
Patented Dec. 1, 1970

---

3,544,630
NOVEL EXPLOSIVE COMPOUNDS
Milton B. Frankel, Tarzana, and Gerald L. Rowley, Albany, Calif., assignors to North American Rockwell Corporation
No Drawing. Filed Dec. 13, 1967, Ser. No. 691,920
Int. Cl. C07c 103/22
U.S. Cl. 260—558                                      3 Claims

---

ABSTRACT OF THE DISCLOSURE

Novel N - (dinitrofluoro - lower alkylene) - trinitrobenzamides which are useful as explosives.

---

The present invention relates to a novel, exothermic, energetic composition of matter. More particularly, the instant invention pertains to a chemical explosive substituted aromatic amide possessing increased thermal stability and decreased shock sensitivity. Specifically, the subject invention concerns a N-(dinitrofluoro-lower alkylene)-trinitrobenzamide explosive.

Chemical compounds capable of exerting characteristic high velocity reactions, generally are known as explosives, are important for both military and commercial applications. However, the application of many presently available explosives for these purposes is especially hazardous as an explosion may be prematurely initiated by sudden shock, by exposure to temperature changes, or by a combination of shock and temperature. For these explosives, this high sensitivity to shock and temperature often renders their use impractical or it often necessitates their use in conjunction with nonexplosive ingredients for the accompanying desensitized or phlegmatized conditions.

The prior art attempts to produce high energy, less shock sensitive and more thermally stable chemical explosives have not been too successful. For example, certain nitro aromatic explosives like trinitrotoluene possess high thermal stability, but it also possesses relatively low energy levels. Other explosives have high energy levels but possesss unsuitable thermal and impact stability. Thus, in view of the foregoing discussion, it can readily be seen that the art needs a chemical explosive possessing desirable energetic, thermal stability and accompanying decreased shock sensitive properties.

Accordingly, it is an object of the present invention to make available to the art novel chemical explosive compositions of matter possessing increased thermal stability and decreased shock sensitivity.

It is a further object of the instant invention to provide novel aromatic amide explosives suitable for many applications in the commercial and military fields.

A still further object of the subject invention is to provide N-(dinitrofluoro-lower alkylene)-trinitrobenzamide compounds possessing improved shock resistant and temperature stable properties.

Still a further object of the invention is to provide a method for preparing less sensitive, more thermally stable benzamide explosives.

These and other objects of this invention will be readily apparent to one skilled in the art upon study of the present disclosure and the accompanying claims.

In attaining the objects and advantages of this invention, it has now been unexpectedly found that improved trinitrofluoro substituted benzamides explosives of the general formula can be

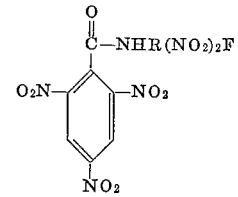

synthesized by the condensation of a nitro-substituted arylacyl halide with a nitrofluoro alkylene amine in the presence of a catalyst to give the appropriate amide. This synthesis of the thermally stable, decrease impact sensitive benzamide explosives can be represented by the following general reaction:

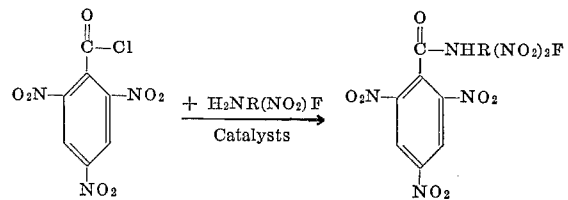

wherein R in the above equation and general formula is a lower alkylene of the straight or branched chain form of from 2 to 4 carbon atoms inclusive. Exemplary of lower alkylene groups are ethylene, propylene, isopropylene, n-butylene and the like.

Typical catalysts suitable for the above general reaction are tertiary amines and heterocyclic nitrogen compounds. Representative tertiary amines are triethylamine, trimethylamine, dimethylmonoethylamine, tributylamines and the like. Representative heterocyclic catalysts are pyridine, piperidine, piperazine, pyrimidine and the like. The amount of catalyst can vary, usually from about 25 to 50 millimoles, to a stoichiometric amount. For the preparation of the amide an excess of catalysts is usually employed, usually about 5 to 10 percent excess.

Generally, the novel benzamide is prepared by first synthesizing the appropriate dinitrofluoralkylene amine. The dinitrofluoroalkylene amine can easily be prepared by adding to the corresponding dinitrofluoroaliphatic alcohol aqueous ammonia, in the presence of an inert solvent, stirring, extracting the organic phase, drying and distilling to produce the desired amine. The preparation of the amine is in accord with the following general reaction: $HOR(NO_2)_2F + NH_3 \rightarrow H_2NR(NO_2)_2F$. The reaction is usually carried out at room temperature under normal atmospheric conditions with about a 1-minute to 60-minute stirring period.

Exemplary of inert solvents suitable for the above reaction are methylene dichloride, carbon tetrachloride, chlorobenzene, chloroform, or an other inert solvent that does not adversely affect the reaction.

The novel benzamide of the invention was next prepared by adding to the just prepared amine dissolved in an inert solvent a nitrosubstituted arylacyl chloride, and, in the presence of a catalyst. Suitable inert solvents and catalysts, and the general reaction were discussed supra. The arylacyl chloride was added stepwise at 0° C., refluxed temperature, generally in the presence of an inert solvent boiling in the range of 40° C. to 100° C., for a couple of hours, under normal atmospheric pressure, and then allowed to stand overnight at room temperature. The reaction was carried out at atmospheric pressure. Finally, the benzamide was extracted from the reaction medium, dried and recrystallized to give the essentially pure product.

The above discussion is merely illustrative of the mode and manner of carrying out the invention, and it is to be understood that the discussion is not intended to be limited to the instant disclosure, as other techniques may be successfully employed.

The following examples are representative of embodiments of the present invention and these examples are not to be construed as limiting as other obvious embodiments will be readily apparent to those versed in the art.

Preparation of 2,2-dinitro-2-fluoroethylamine: A 50 ml. aqueous solution of 2,2-dinitro-2-fluoroethanol (15.4 gm., 0.1 mole) was added dropwise during 75 minutes to a stirred mixture of 55 ml. of 2 N aqueous ammonia (0.11 mole, 10 percent excess) and 50 ml. of methylene chloride. The resulting yellow mixture was stirred an additional 60 minutes, after which it was diluted with methylene chloride. The organic phase was extracted with 4 portions of water, dried over anhydrous magnesium sulfate, and the solvent evaporated under reduced pressure to give 9.3 gm. (61 percent) of crude yellow oil, $n_D{}^{25}$ 1.4435. Distillation gave a colorless liquid, B.P., 40–43 C/0.5 mm., $n_D{}^{25}$ 1.4388, with an infrared spectrum, in Nujol exhibiting maximum peaks at 6.2, 7.5, and 12.5 microns. The distilled sample was recrystallized from ethanol at —80° C. ($n_D{}^{25}$ 1.4392). There was no change in the infrared spectrum. The calculated elemental analysis for $C_2H_4FN_3O_4$ was C, 15.69; H, 2.63; N, 27.46. The found analysis was C, 15.95; H, 2.61; N, 27.90.

EXAMPLE II

Preparation of N-(2,2-dinitro-2-fluoroethyl)-2,4,6-trinitro-benzamide: 2,4,6-trinitrobenzoyl chloride (9.08 gm., 32.9 millimoles) was added in small portions during 35 minutes to a stirred methylene chloride (16.4 ml.) solution at 0° C. of 2,2-nitro-2-fluoroethyl amine (5.02 gm.) and pyridine (2.82 gm., 36.2 millimoles, 10 percent excess). The resulting dark red solution was stirred an additional hour at 0° C., followed by a half hour at room temperature, then it was refluxed for two hours and finally allowed to stand overnight at room temperature. The resulting dark mixture was next dissolved in a large portion of ethyl acetate and 5 percent sodium bicarbonate. The organic phase was washed with three portions each of 5 percent hydrochloric acid, water, 5 percent sodium bicarbonate and water, dried over anhydrous magnesium sulfate, and the solvent removed under reduced pressure to give 7.49 gm. of dark red solid. This solid was then triturated with boiling methylene chloride and ethyl acetate, and filtered to give 3.43 gm. of pink solid, M.P. 164.5–166.5 decomposition. The analytical sample was prepared by three recrystallizations from ethanol and the pale yellow prisms had a M.P. of 170.5–171.5° C., decomposition. The calculated elemental analysis for $C_9H_5FN_6O_{11}$ was C, 27.56; H, 1.29; N, 21.43. The found analysis was C, 27.82; H, 1.31; N, 21.34. Infrared spectrum analysis for the compound, in Nujol, exhibited maximum peaks at 5.9, 6.2, 6.4 and 7.4 microns. The compound has a density of 1.843 gm./cc.

The novel explosives of the invention prepared by the above described process were tested by standard explosive evaluation tests to demonstrate the unexpected results of the present invention. The tests conducted were the drop test and the vacuum thermal stability test.

The drop test measures the sensitivtiy of a given explosive to shock or impact. The drop test consists of placing a small sample upon a hard surface and allowing a known weight, usually 5 pounds, to drop onto the sample from a predetermined height. The height from which the weight must drop to explode the sample is a measure of the sample's sensitivity to shock or impact.

The vacuum thermal stability test measures the heat sensitivity and it indicates the volume of gas evolved for a known explosive sample heated to a predetermined temperature and maintained at said temperature for any given time.

The results of these tests for N-(2,2-dinitro-2-fluoroethyl)-2,4,6-trinitrobenzamide are as follows:

Impact sensitivity—50 in./5 lb. wt.
Vacuum thermal stability—ml. gas evolved/g. at 165° C.:
0.84 ml./1 hr., 1.50 ml./3 hr., and 1.84 ml./5 hr.

The unobvious increased impact insensivity for the above-listed explosive can readily be seen when it was compared against a known explosive "RDX" (cyclotrimethylene trinitroamine) which exhibited an impact sensitivity of 28 inches per 5-pound weight.

The explosives of the present invention can be used for many endeavors, such as, oil well shooting, propellants, ordnance, demolition, incendiary compositions and the like. They can be used in the pure form or mixed with other explosives like nitroglycerine, ammonium nitrate, picric acid, pentaerythritol tetranitrate and the like.

Obviously, many modifications and variations of the instant invention are possible in the light of the above teaching. It is, therefore, to be understood that within the scope of the disclosure and appended claims, the invention may be practiced otherwise than as specifically described.

We claim:
1. A novel compound of the general formula:

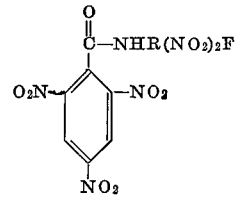

wherein R is a lower alkylene of 2 to 4 carbon atoms.
2. N-(2,2-dinitro-2-fluoroethyl)-2,4,6-trinitrobenzamide.
3. A process for preparing N-(2,2-dinitro-2-fluoro-lower alkylene)-2,4,6-trinitrobenzamides wherein said process comprises the condensation of a 2,4,6-trinitrobenzoyl halide with a 2,2-dinitro-2-fluoro-lower alkylene amine in the presence of a catalyst, and extracting said benzamide.

References Cited
UNITED STATES PATENTS
3,316,292  4/1967  Schaeffler _____ 260—644 UX LELAND A. SEBASTIAN, Primary Examiner U.S. Cl. X.R.
149—105